United States Patent
Wang et al.

(10) Patent No.: US 6,310,136 B1
(45) Date of Patent: Oct. 30, 2001

(54) BLENDS OF BIODEGRADABLE POLY (HYDROXY ESTER ETHER) THERMOPLASTIC WITH RENEWABLE PROTEINS

(75) Inventors: Chaohua Wang, Peoria; Craig J. Carriere, Morton, both of IL (US)

(73) Assignees: The United States of America as represented by the Secretary of Agriculture, Washington, DC (US); The Biotechnology Research & Development Corp., Peoria, IL (US)

(*) Notice: Subject to any disclaimer, the term of this patent is extended or adjusted under 35 U.S.C. 154(b) by 0 days.

(21) Appl. No.: 09/627,607

(22) Filed: Jul. 28, 2000

Related U.S. Application Data
(60) Provisional application No. 60/149,255, filed on Aug. 17, 1999.

(51) Int. Cl.[7] .............................. C08G 63/48; C08G 63/91
(52) U.S. Cl. .................... 525/54.1; 525/54.4; 525/390; 525/403; 525/437; 524/18; 524/25; 524/81; 524/401; 524/539; 524/540; 528/87; 528/176; 528/190; 264/5; 264/464; 264/176.1; 264/299; 264/328.1
(58) Field of Search ................... 524/18, 25, 81, 524/401, 539, 540; 528/87, 176, 190; 264/5, 464, 176.1, 299, 328.1; 525/54.1, 54.4, 390, 403, 437

(56) References Cited

U.S. PATENT DOCUMENTS

| | | | |
|---|---|---|---|
| 5,171,820 | * 12/1992 | Mang et al. | 528/87 |
| 5,384,187 | * 1/1995 | Uemura et al. | 428/262 |
| 5,391,423 | * 2/1995 | Wnuk et al. | 428/217 |
| 5,412,005 | * 5/1995 | Bastioli et al. | 534/47 |
| 5,496,910 | * 3/1996 | Mang et al. | 528/88 |
| 5,665,786 | * 9/1997 | Xu et al. | 531/84.1 |
| 5,821,286 | * 10/1998 | Xu et al. | 524/47 |
| 5,852,078 | * 12/1998 | Willett et al. | 524/35 |
| 5,854,345 | * 12/1998 | Xu et al. | 525/54.24 |
| 5,861,216 | * 1/1999 | Doane et al. | 428/532 |
| 6,025,417 | * 2/2000 | Willett et al. | 524/17 |
| 6,040,063 | * 3/2000 | Doane et al. | 428/532 |
| 6,054,510 | * 4/2000 | Willett et al. | 524/35 |

FOREIGN PATENT DOCUMENTS
WO 97/23564 * 7/1997 (WO).

* cited by examiner

*Primary Examiner*—Samuel A. Acquah
(74) *Attorney, Agent, or Firm*—M. Howard Silverstein; Curtis P. Ribando; John D. Fado

(57) ABSTRACT

Compositions of the invention are produced by blending hydroxy-functional polyesters with proteins at elevated temperatures. These compositions can be shaped into articles by known processes such as extrusion, compression molding, and injection molding. Among articles that can be made from such compositions are those with sufficiently strong tensile strengths as to form disposable utensils. However, the compositions are more environmentally friendly than commodity plastics such as polyethylene or polystyrene.

21 Claims, 4 Drawing Sheets

BLENDS OF BIODEGRADABLE POLY (HYDROXY ESTER ETHER) THERMOPLASTIC WITH RENEWABLE PROTEINS

This application claims the benefit under 35 U.S.C. §119(e) of U.S. provisional application Ser. No. 60/149,255, filed on Aug. 17, 1999, incorporated by reference herein.

BACKGROUND OF THE INVENTION

1. Field of the Invention

The present invention generally relates to compositions useful for forming articles by means such as thermoplastic processing (e.g., molding, extrusion and casting), and more particularly relates to certain synthetic hydroxy-functional polyester containing compositions hereinafter sometimes referred to as "hydroxy-functional polyester compositions." Articles with good mechanical properties, such as tensile strength and/or tensile elongation, can be made with these synthetic hydroxy-functional polymers in combination with natural polymers. Such articles are biodegradable and have a reduced cost of manufacture due to the inclusion of a low cost natural polymer, such as protein.

More specifically, this invention relates to novel compositions comprising blends of poly(hydroxy ester ether) with various renewable proteins.

2. Background of the Invention

Natural polymers have been the focus of considerable research interest in attempts to use these as fillers in order to decrease polymer costs and to use polymers that are biodegradable. Several recent examples including Uemura et al. (U.S. Pat. No. 5,384,187), Wnuk et al. (U.S. Pat. No. 5,391,423), and Bastioli et al. (U.S. Pat. No. 5,412,005) all represent attempts to achieve biodegradable polymer compositions in which natural polymers such as starches have been added to synthetic polymers. Unfortunately, while the inclusion of natural polymers can reduce costs, the mechanical properties of the synthetic polymer can be so adversely affected by inclusion of the natural polymer as to vitiate the cost advantages.

One successful system for blending thermoplastic polymers with natural polymers relies upon the use of certain hydroxy functional polyethers, also called "polyhydroxy ester ethers" or "PHEE". In WO 97/23564, Mang et al. discloses blending PHEEs with polysaccharides, particularly granular starches. The resulting compositions are disclosed as being useful for making granules that could subsequently be processed into useful articles by injection molding, foaming, film formation and the like.

Xu et al. (U.S. Pat. No. 5,665,786) discloses using the same PHEEs as taught by Mang et al., supra, and starch in the making of thermoformed articles having exterior surfaces that are substantially resistant to moisture. In U.S. Pat. No. 5,821,286, Xu also discloses the use of PHEEs and gelatinized starch in the making of biodegradable films.

Willet et al. (U.S. Pat. No. 5,852,078) produces a composition useful for formed articles from PHEE and granules of starch, a modified starch, or guar gum.

The search continues for alternatives to the aforementioned systems for producing synthetic polymer-based compositions that can be formed into useful articles. Such articles include, for example, disposable plastic utensils or stretchable thin films for food packaging purposes, that are reasonably competitive in price with commodity plastics such as polyethylene or polystyrene, but which are more environmentally friendly and reduce the dependence on petroleum products.

SUMMARY

We have now discovered useful compositions that comprise a synthetic, hydroxy-functional polymer and a protein. The synthetic polymer is a hydroxy-functional polyester (PHEE) that is surprisingly compatible with the protein. The inventive compositions are useful for forming articles, particularly by thermoplastic processing such as molding, extrusion, and casting.

In accordance with this discovery, it is an object of the invention to produce novel blends of PHEE and natural proteins.

It is another object of the invention to produce biodegradable and environmentally-friendly compositions that are useful for forming articles of manufacture having acceptable physical properties for a variety of end uses.

Another object of the invention is to provide a substitute for synthetic polymers for the production of disposable plastic articles, such as eating utensils and packaging materials.

Other advantages and aspects of the present invention will become apparent upon reading the specification and the appended claims.

DETAILED DESCRIPTION

Broadly, the present invention comprises a composition consisting essentially of two essential components: the first component is a synthetic hydroxy-functional polymer, more particularly it is an hydroxy-functional polyester having a repeating structure as will be described, below; and the second component is a protein.

Suitable Hydroxy-Functional Polyesters

The synthetic polymer is a PHEE as described by Mang et al. (U.S. Pat. No. 5,171,820, issued Dec. 15, 1992) and by Mang et al. (U.S. Pat. No. 5,496,910, issued Mar. 5, 1996), both herein incorporated in their entirety by reference. Such useful hydroxy-functional polyesters for this invention may be prepared from base-catalyzed nucleophilic addition of suitable acids to epoxies, which reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C.

Biodegradability studies indicate that various soil bacteria (such as *Pseudomonas putida*) are able to utilize the synthetic polymers as a substrate for cell culture growth.

A representative structure for suitable hydroxy-functional polyesters contemplated by this invention is shown by Formula A (where n is a value that provides a sufficient molecular weight, such as for example a m.w. of about 50,000–100,000). Higher molecular weights are preferred due to higher strength.

FORMULA A

In Formula A, each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2$, $R^3$, x, and y are as defined above).

FORMULA B

Such polyesters may be prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present invention, are sometimes hereinafter designated "BIS CHD," "BIS adipic," "HQ DDCA" and "BIS DDCA." These polymers will include some repeating unit structures, where the repeating units are illustrated respectively by Formulas C–F. Several of their properties of interest for purposes of the invention are summarized in Table A.

FORMULA C

FORMULA D

FORMULA E

FORMULA F

In Formulas C–F, "n" preferably is as earlier described.

With reference to the data of Table A, it is apparent that two of the hydroxy-functional polyesters used to illustrate the granule embodiment of the invention have an extraordinarily high percentage elongation property (HQ DDCA and BIS DDCA). Thus, these polyesters (or others with a relatively high percentage elongation property) are preferred candidates in the formulation of an embodiment of the invention having high percent elongation.

TABLE A

| Hydroxy-Functional Polyester Components | Tg (° C.) | Tensile Strength (MPa) | % Elongation |
|---|---|---|---|
| BIS CHD | 66 | 60–61 | 172 |
| BIS adipic | 45 | 12 | 157 |
| HQ DDCA | 10 | 14 | 612 |
| BIS DDCA | 20 | 1.2 | 487 |

Similarly, the high tensile strength properties of BIS CHD (Table A) would render this polyester a suitable candidate for use in formulations intended to yield a product having high tensile strength; however, due to the remarkable compatibility of natural polymers with the hydroxy-functional polyesters, even a polyester with a relatively modest tensile strength, such as BIS adipic, can be formulated to have substantially improved tensile strength. This is demonstrated in Example 5, below.

The repeating units of the synthetic hydroxy-functional polymers of the invention described, above, are alternatively described by Formula I in Mang et al. (WO 97/23564, U.S. Pat. No. 5,496,910 and U.S. Pat. No. 6,025,417, all incorporated herein by reference).

FORMULA I wherein $R^a$ individually represents a divalent organic moiety which is predominantly hydrocarbylene (where the term "hydrocarbylene" means a divalent aliphatic hydrocarbon moiety, such as alkylene, alkenylene or cycloalkylene having from 2 to 20 carbons and optionally containing a heteroatomic group, such as oxygen, sulfur, imino, sulfonyl, carboxyl, carbonyl or sulfoxyl, in the chain or pendant thereto) or a combination of different organic moieties which are predominantly hydrocarbylene; $R^c$ is $R^d$ is wherein $R^b$ is a divalent organic moiety which is predominantly hydrocarbylene or $R^e$ is hydrogen or lower alkyl, such as methyl, ethyl, butyl and propyl, more preferably hydrogen, $R^f$ is independently an organic moiety which is predominantly hydrocarbylene, $R^g$ is independently hydrogen or methyl, n' is an integer from about 0 to about 100, and x' and y' are independently integers from 0 to 100.

Representative divalent organic moieties useful as $R^a$, $R^b$, and $R^f$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide, and diarylene sulfide.

In the more preferred hydroxy-functional polyethers, $R^a$, $R^b$, and $R^f$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n' is from 0 to 10.

Suitable Proteins

Proteins contemplated for use herein include all natural, and modified proteins, and preferably those that are of plant origin and those that are readily biodegradable. Typically, these proteins will be derived from seeds of cereals or legumes. Examples of suitable proteins without limitation thereto are soybean protein isolates, wheat gluten proteins, such as gliadins and glutenins, zein, chitin, and chitosan. These proteins may be raw, cooked, unmodified, modified, hydrolyzed, deaminated, or the like. They may be soluble in water, partly soluble or insoluble.

The amount of protein relative to the hydroxy-functional polymer depends on a variety of factors, including the specific polymer and the specific protein employed and the desired end uses of the composition. The protein can generally be present in the amount of about 10–85% based on the total weight of the protein and the hydroxy-functional polymer. Preferably the amount of protein will be in the range of 30–75% and most preferably in the range of 50–70%. In the compositions of the invention, the protein will typically constitute the dispersed phase in the PHEE, which is the continuous phase. It is possible to utilize proteins to adjust the mechanical properties of a system. Typically, the higher level of protein, the higher the value of Young's modulus. Also, when the principal protein is soybean protein, the addition of a moderate amount of hydrolyzed wheat gluten could be used to enhance the percent elongation.

The hydroxy-functional polymer, the protein and any optional components as discussed below may be processed in any conventional apparatus or combination of devices that will both cook (heat) the components and blend them into a substantially homogeneous mixture. Exemplary devices include a single screw extruder, a twin screw extruder, compression molder and injection molder. The conditions of processing will of course depend upon the specific materials being mixed and their proportions. Generally, the temperature should be maintained below that at which the protein denatures (or burns) and above the protein melt temperature. Usually, the processing temperatures will be within the range of about 140–195° C. The higher the temperature, the shorter the time of cooking. At temperatures within the middle of the aforementioned range, the components can be processed for one hour or more without denaturing the protein.

Optional Components

A plasticizer can be added to the inventive compositions to achieve greater material processability and product flexibility, although plasticizers typically soften the compositions in which they are included. Molded articles and films prepared from blends including plasticizers preferably use plasticizers that are biodegradable. Examples of biodegradable plasticizers include various esters, such as phthalate esters, and various other biodegradable esters known in the chemical arts.

Inorganic fillers can be added, such as talc, calcium carbonate, diatomaceous earth, and so forth.

Precursor film-forming compositions of the invention can have part of the hydroxy-functional polymer replaced by a synthetic vinyl polymer such as poly(vinyl alcohol) or "PVA." Thus, amounts of PVA may range from 0–40 wt. % of the total formulated compositions and of the resulting films of the invention. Inclusion of PVA will enhance film softness and film elongation, but also reduces water resistance. Therefore, the choice of whether to add PVA and the selection of the amount to be added will depend upon the balance of properties desired for the resulting films.

Other optional components known in the art, including, but not limited to, antiblocking agents, antistatic agents, slip agents, pro-heat stabilizers, antioxidants, pro-oxidant, additives may be incorporated, depending upon the application.

Antiblocking agents act to prevent film layers from sticking to one another when wound into a roll or when packaged in contact with one another. Typical antiblocking substances include concentrates of silica or talc blended with a polymeric materials such as polyethylene or polycaprolactone.

Reduction of blocking can also be obtained by loading the film surface with small particles or powders such as chalk, clay, silica, starch, and similar materials. Powdered polymeric materials (e.g. polytetrafluoroethylene) can also be used to reduce blocking when applied to the surface of films of the present invention. Such film surface treatments can be used to reduce blocking alone or in combination with other antiblock methods. The quantity of powder antiblock substance commonly added to the surface of a film, when used, is from about 0.5 $g/m^2$ to about 5 $g/m^2$.

Antistatic agents may be incorporated into films of the present invention. Examples of such agents include ethoxylated amines and quaternary amine salts having organic constituents of about 12–18 carbon atoms in length. Agents of this type slowly diffuse to the surface of the film and, because of their ionic character, form an electrically conductive layer on the surface of the film. Antistatic agents are commonly at a level of from about 1% to about 5% of the weight of the films.

Slip agents may be incorporated into the films of the present invention to reduce drag over rollers and other forming equipment. Examples of such agents are those commonly derived from amides of fatty acids having about 12–22 carbon atoms. Such agents may augment the antiblocking properties of the films of the present invention. Such slip agents are commonly incorporated into films at levels of from about 0.05% to about 3% of the weight of the films.

EXAMPLE 1

Soybean protein isolates, EDI Pro A® from PTI, (5.5±0.2% water content) was blended with BIS adipic PHEE (having the structure of Formula D, supra) at various ratios (20–70% protein) in a Werner & Pfleiderer ZSK-30® twin screw extruder (Ramsey, N.J.). The temperatures at every zone were carefully set in the range of 120–140° C., based on data obtained from DSC thermal analysis indicating that EDI Pro A® softened around 125° C. and denatured around 180° C. Screw rates were set at about 100 RPM and sample feed was approximately 60 g/min. Extrudates were immediately chopped into a pellets using an Allenair ACD-120® chopper (Mieola, N.Y.). Pellets were stored under vacuum to remove residual moisture.

EXAMPLE 2

Hydrolyzed wheat gluten, Flavor Pro 400® from Midwest Grain Products, Inc., (5.5±0.4% water content) was blended with BIS adipic PHEE at various ratios in a Werner & Pfleiderer ZSK-30® twin screw extruder operated under the same conditions described in Example 1. Extrudates were pelleted and stored under vacuum as described in Example 1.

EXAMPLE 3

Hydrolyzed wheat gluten, Flavor Pro 1000® from Midwest Grain Products, Inc., (5.5±0.1% water content) was blended with BIS adipic PHEE at various ratios in a Werner & Pfleiderer ZSK-30® twin screw extruder operated under the same conditions described in Example 1. Extrudates were pelleted and stored under vacuum as described in Example 1.

EXAMPLE 4

The pellets produced in Examples 1–3 were used to make tensile bars in an ATC-40-1.5 injection molding machine manufactured by Cincinnati Milacron Marketing Company (Batavia, Ohio) following ASTM D638. The machine was operated under a pressure of 8000 psi and a temperature controlled within the range of 140–160° C. to promote softening of the pelleted blends while avoiding denaturing. The resulting tensile bars were stored at 25° C. and 50% RH for seven days before testing.

EXAMPLE 5

Figure 1:
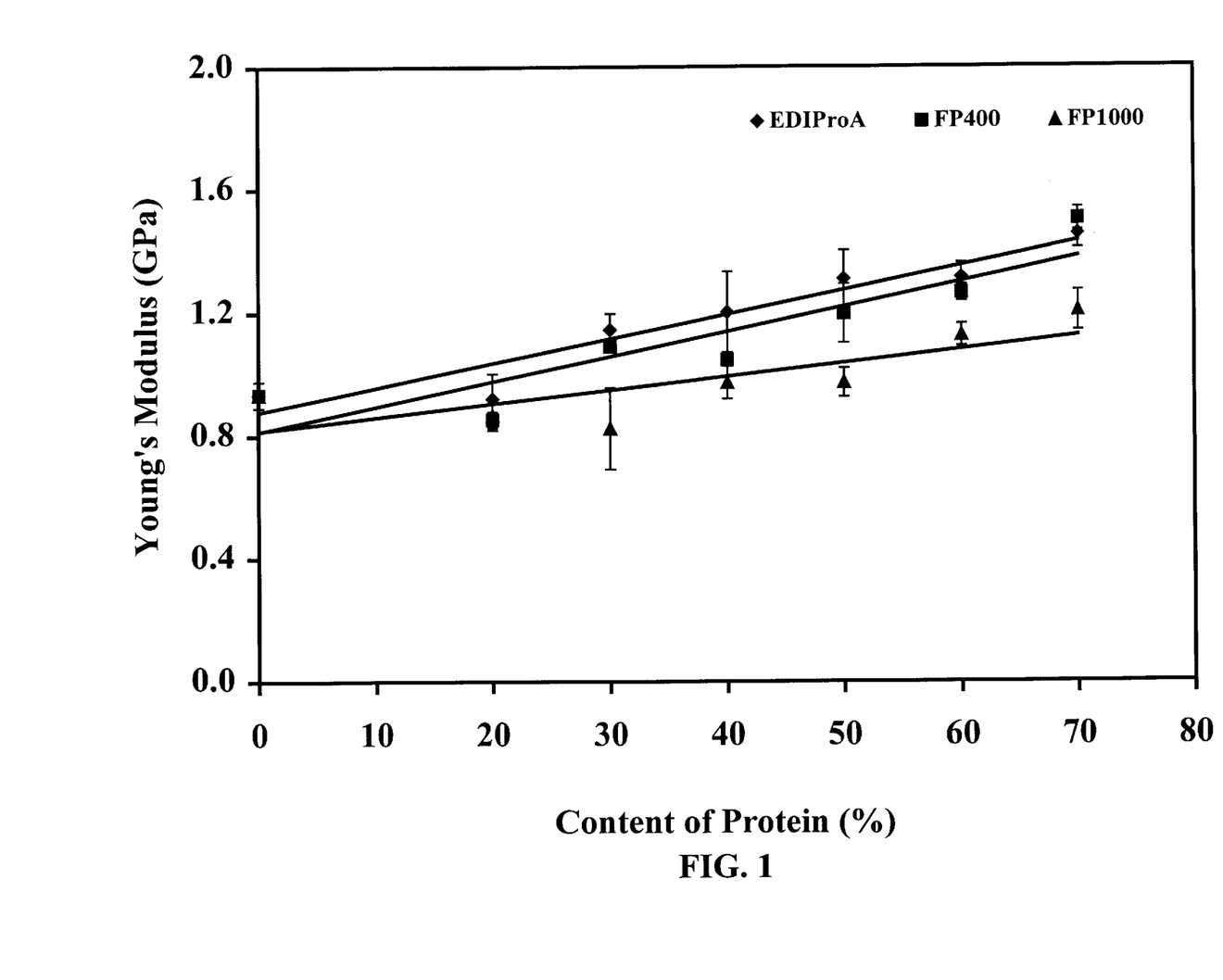
FIG. 1 is a plot of Young's modulus against the percent of soybean protein isolate (EDI Pro A), hydrolyzed wheat protein (FP 400), and hydrolyzed wheat protein (FP 1000).
Figure 2:
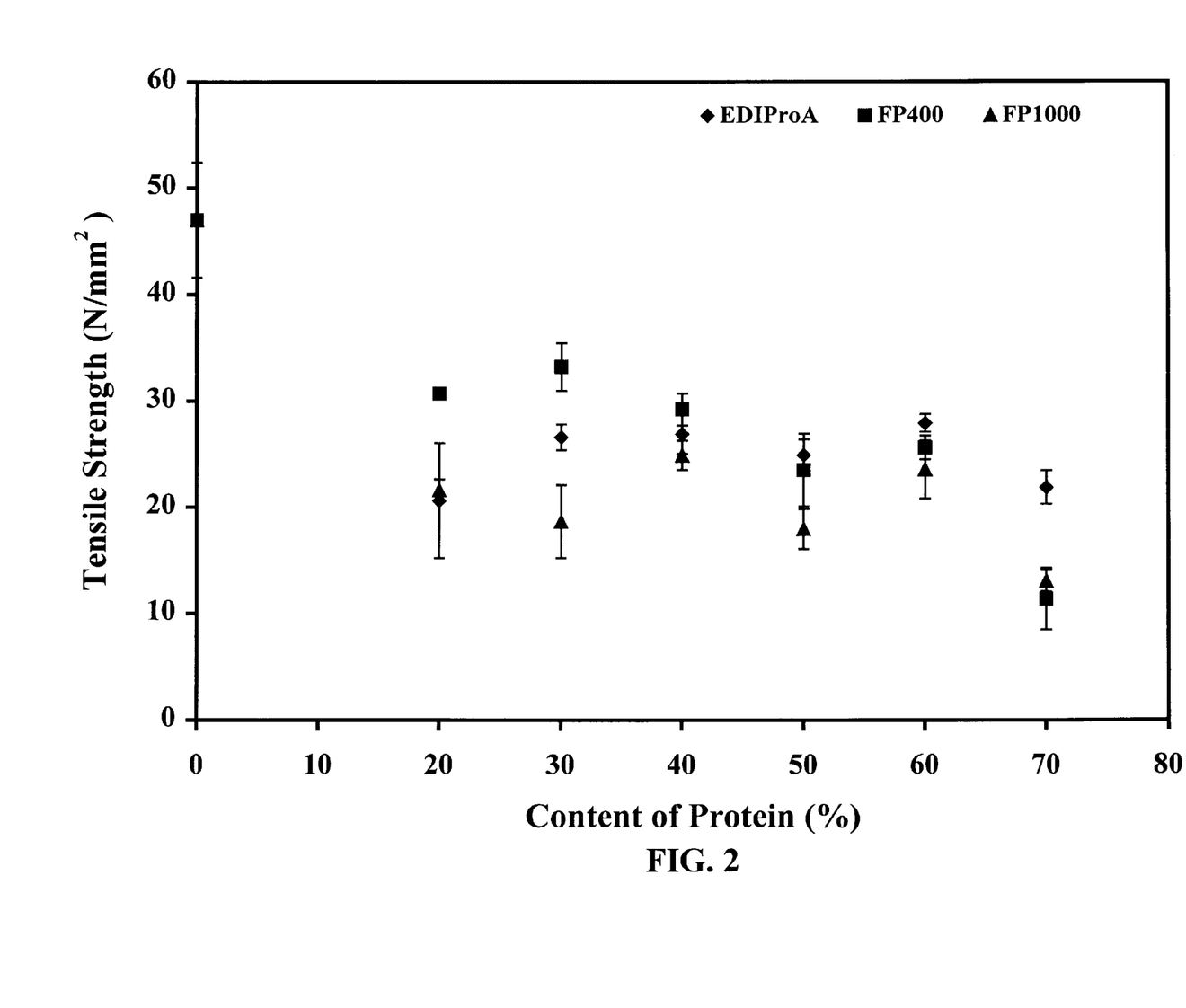
FIG. 2 is a plot of tensile strength against the percent of soybean protein isolate (EDI Pro A), hydrolyzed wheat protein (FP 400), and hydrolyzed wheat protein (FP 1000).
Figure 3:
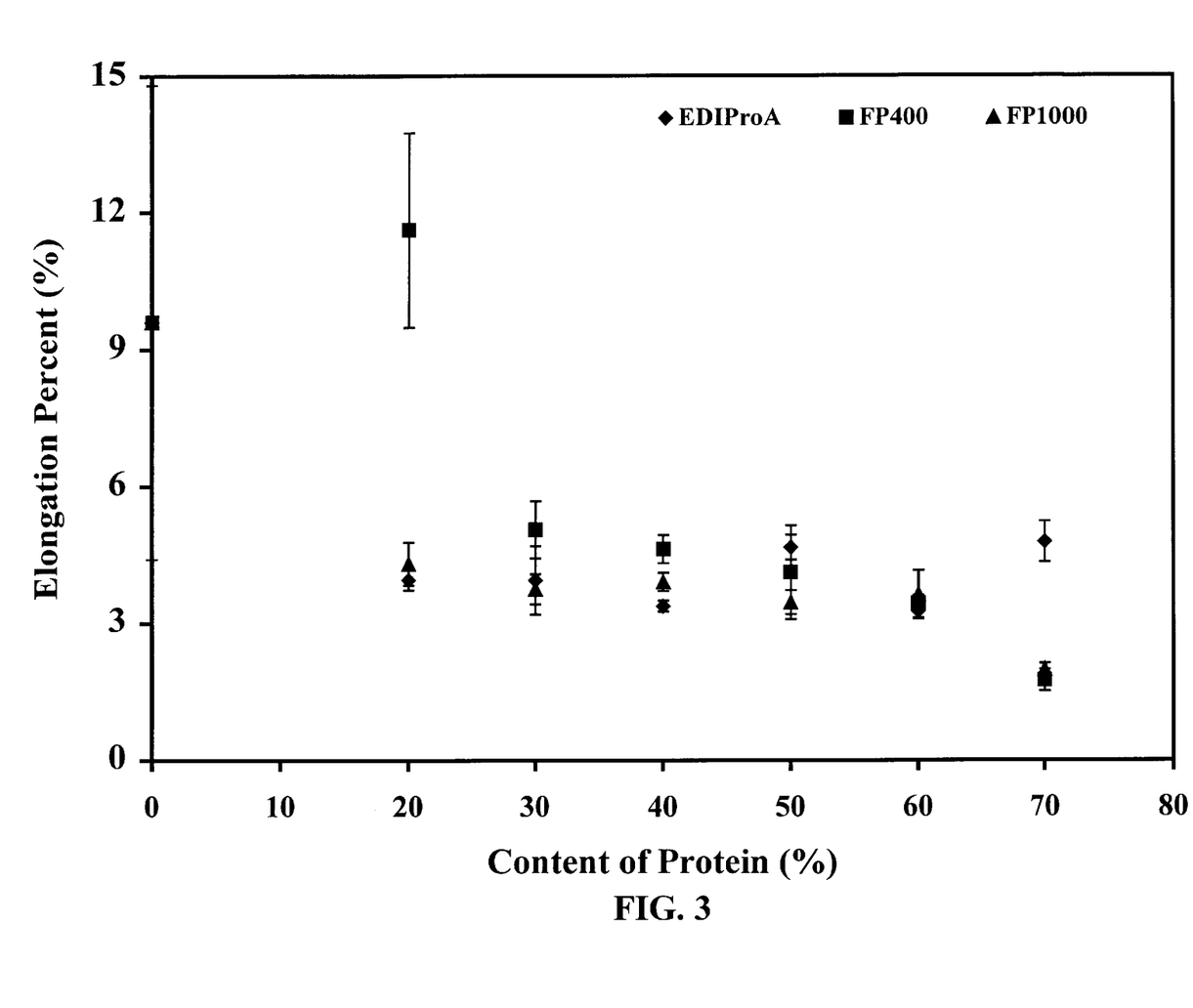
FIG. 3 is a plot of percent elongation against the percent of soybean protein isolate (EDI Pro A), hydrolyzed wheat protein (FP 400), and hydrolyzed wheat protein (FP 1000).

An Instron 4201® (Instron Corp., Canton, Mass.) was used to determine mechanical properties of the tensile bars produced in Example 4. The measurements were conducted at a crosshead speed of 50mm/min, 25° C. and 50% RH. Young's modulus, tensile strength, and percent elongation were determined for each composition (FIGS. 1–3).

Figure 4:
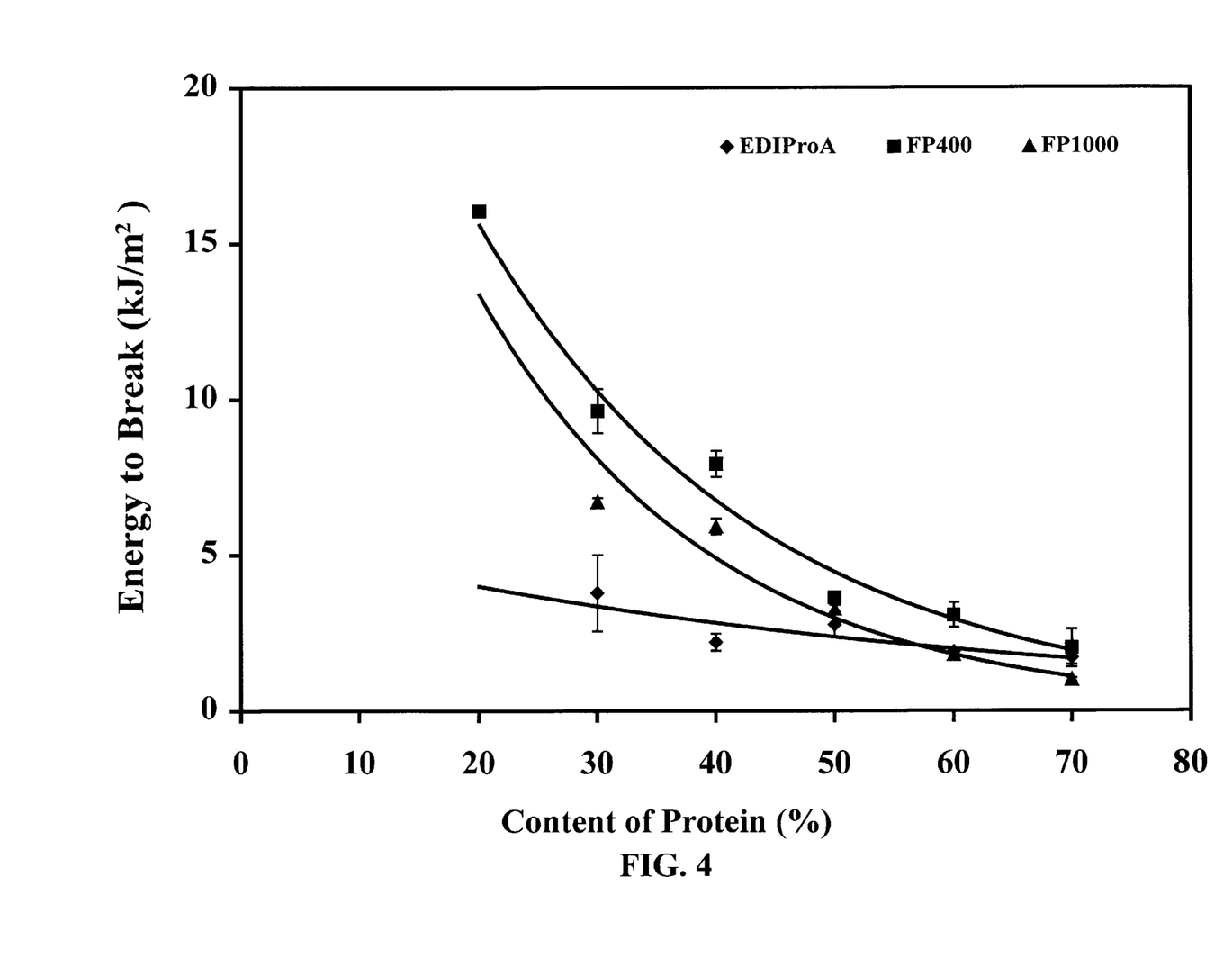
FIG. 4. is a plot of energy to break (fracture) against the percent of soybean protein isolate (EDI Pro A), hydrolyzed wheat protein (FP 400), and hydrolyzed wheat protein (FP 1000).

Samples for fracture test (65.0±5.0 length, 12.7±0.2 mm width, and 2.74±0.10 thick) were trimmed from the tensile bars. A CS-93M-047 sample notcher by Customer Scientific Instruments, Inc. (Long Island, N.Y.) was used to make a 0.2 mm notch along the 2.74 side before the fracture testing. The fracture test was carried out at a crosshead speed of 50 mm/min., 25° C. and 50% RH. The results reported as "energy to break" are shown in FIG. 4.

The increase of Young's modulus (FIG. 1) and the decrease of energy to break (FIG. 4) indicate that these composite materials become more brittle with addition of proteins.

It is to be understood that while the invention has been described above in conjunction with preferred specific embodiments, the description and examples are intended to illustrate and not limit the scope of the invention, which is defined by the scope of the appended claims.

We claim:
1. A composition of matter comprising:
   a protein; and
   a synthetic hydroxy-functional polymer admixed with the protein, the synthetic hydroxy-functional polymer having repeating units represented by Formula I:

FORMULA I wherein $R^a$ individually represents a divalent organic moiety which is predominantly hydrocarbylene or a combination of different organic moieties which are predominantly hydrocarbylene, $R^c$ is $R^d$ is wherein $R^b$ is a divalent organic moiety which is predominantly hydrocarbylene or

$R^e$ is hydrogen or lower alkyl, $R^f$ is independently an organic moiety which is predominantly hydrocarbylene, $R^g$ is independently hydrogen or methyl, n' is an integer from about 0 to about 100, and x' and y' are independently integers from 0 to 100;
wherein said protein is present in an amount of at least 30% and up to about 85% based on the total weight of the protein and the hydroxy-functional polymer.

2. The composition of claim 1 wherein $R^a$, $R^b$, and $R^f$ include alkylene, cycloalkylene, alkylene-arylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide, and diarylene sulfide.

3. The composition of claim 1 wherein $R^a$, $R^b$, and $R^f$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, or 1,2-cyclohexylene optionally substituted with at least one hydroxyl group, p-phenylene, m-phenylene, or 2,6-naphthalene, diphenylene-isopropylidene, sulfonyldiphenylene, carbonyldiphenylene, oxydiphenylene, or 9,9-fluorenediphenylene and n' is from 0 to 10.

4. The composition of claim 1 wherein $R^a$, $R^b$, and $R^f$ are represented by the formula:

wherein $R^g$ is independently hydrogen or methyl and x' and y' are independently from 0 to 100.

5. The composition of claim 1 where $R^a$ and $R^f$ are independently p-phenylene, m-phenylene, or 2,6-naphthalene.

6. The composition of claim 1 wherein $R^b$ is m-phenylene, p-phenylene, naphthylene, diphenyleneisopropylidene, sulfonyldiphenylene, carbonyldiphenylene, oxydiphenylene, or 9,9-fluorenediphenylene.

7. The composition of claim 1 wherein $R^e$ is hydrogen.

8. The composition of claim 1 wherein n' is from 0 to 10.

9. The composition of claim 1 wherein said synthetic hydroxy-functional polymer is the compound defined by Formula D:

FORMULA D

10. The composition of claim 1 wherein the protein is a natural protein.

11. The composition of claim 1 wherein the protein is a cereal seed or legume seed protein.

12. The composition of claim 11 wherein the protein is a soy isolate.

13. The composition of claim 1 further including one or more of a plasticizer and a filler.

14. A shaped article derived from the composition of claim 1.

15. A method for producing a shaped article comprising:
  a. blending together under elevated temperatures to produce an intimate mixture:
    a protein; and
    a synthetic hydroxy-functional polymer admixed with the protein, the synthetic hydroxy-functional polymer having repeating units represented by Formula I:

FORMULA I wherein $R^a$ individually represents a divalent organic moiety which is predominantly hydrocarbylene or a combination of different organic moieties which are predominantly hydrocarbylene, $R^c$ is $R^d$ is wherein $R^b$ is a divalent organic moiety which is predominantly hydrocarbylene or $R^e$ is hydrogen or lower alkyl, $R^f$ is independently an organic moiety which is predominantly hydrocarbylene, $R^g$ is independently hydrogen or methyl, n' is an integer from about 0 to about 100, and x' and y' are independently integers from 0 to 100; and b. shaping said mixture into said article;
  wherein said protein is present in an amount of at least 30% and up to about 85% based on the total weight of the protein and the hydroxy-functional polymer.

16. The method claim 15 wherein said synthetic hydroxy-functional polymer is the compound defined by Formula D:

FORMULA D

17. The method of claim 15, wherein said protein is a cereal seed or legume seed protein.

18. The method of claim 15 wherein the protein is a soy isolate.

19. The method of claim 15 wherein said blending and shaping is conducted by extrusion.

20. The method of claim 15 wherein said blending and shaping is conducted by compression molding.

21. The method of claim 15 wherein said blending and shaping is conducted by injection molding.

* * * * *